(12) United States Patent
Hoke et al.

(10) Patent No.: US 11,860,018 B2
(45) Date of Patent: Jan. 2, 2024

(54) RATE-OF-CHANGE FLOW MEASUREMENT DEVICE

(71) Applicant: HORIBA STEC, Co., Ltd., Kyoto (JP)

(72) Inventors: Thomas Hoke, Stateline, NV (US);
Tyson Stephenson, Reno, NV (US);
Patrick Lowery, Reno, NV (US)

(73) Assignee: HORIBA STEC, Co., Ltd., Kyoto (JP)

( * ) Notice: Subject to any disclaimer, the term of this patent is extended or adjusted under 35 U.S.C. 154(b) by 335 days.

(21) Appl. No.: 17/377,774

(22) Filed: Jul. 16, 2021

(65) Prior Publication Data

US 2022/0049982 A1 Feb. 17, 2022

Related U.S. Application Data

(60) Provisional application No. 63/065,995, filed on Aug. 14, 2020.

(51) Int. Cl.
| | |
|---|---|
| *G01F 15/00* | (2006.01) |
| *G01F 25/10* | (2022.01) |
| *G01F 1/40* | (2006.01) |
| *G05D 16/20* | (2006.01) |
| *G01F 15/06* | (2022.01) |

(52) U.S. Cl.
CPC ............. *G01F 15/005* (2013.01); *G01F 1/40* (2013.01); *G01F 15/06* (2013.01); *G01F 25/10* (2022.01); *G05D 16/2013* (2013.01)

(58) Field of Classification Search
CPC ........ G01F 15/005; G01F 25/00; G01F 25/10; G01F 25/15
See application file for complete search history.

(56) References Cited

U.S. PATENT DOCUMENTS

| 8,443,649 | B2 * | 5/2013 | Yasuda | ................... G01F 25/10 |
|---|---|---|---|---|
| | | | | 702/113 |
| 10,031,004 | B2 * | 7/2018 | Ding | ......................... G01F 1/34 |
| 2019/0033896 | A1 * | 1/2019 | Yasuda | ................... G01F 1/363 |
| 2019/0204857 | A1 * | 7/2019 | Yasuda | ................ G05D 7/0664 |

\* cited by examiner

*Primary Examiner* — Erika J. Villaluna
(74) *Attorney, Agent, or Firm* — Alleman Hall Creasman & Tuttle LLP

(57) ABSTRACT

A rate-of-change flow measurement device is provided including first pressure sensor, a position control valve with a valve position sensor, a second sensor position and a chamber comprising a part of the flow path of the device, and an isolation valve, arranged in this order along the flow path of the device. The device receives valve position data from the valve position sensor and pressure data from the pressure sensors, and calculates a volume of the chamber at least in part using the valve position data when a calibration of a device-under-test is performed by decreasing a pressure of the chamber or increasing the pressure of the chamber while opening the position control valve to maintain the pressure reading of the first pressure sensor constant to stay at a pressure set point.

20 Claims, 8 Drawing Sheets

RATE-OF-CHANGE FLOW MEASUREMENT DEVICE

CROSS REFERENCE TO RELATED APPLICATIONS

This application claims priority to U.S. Provisional Patent Application Ser. No. 63/065,995, filed Aug. 14, 2020, the entirety of which is hereby incorporated herein by reference for all purposes.

BACKGROUND

Mass flow controllers (MFC) are used to measure and control the flow of liquids and gases in fluid flow systems. Mass flow controllers are frequently used in applications such as semiconductor device manufacturing in which it is desirable to determine the amount of fluid flowing through the mass flow controller with a high level of accuracy. The flow rate is typically computed based on measured properties of the fluid and the valve rather than being measured directly. Accurate calibration and validation of such small-scale, precision mass flow controllers are difficult to implement, especially with those with small chamber volumes for measuring and controlling especially low flow rates. Small variations in the position of a control valve of the mass flow control can affect the downstream chamber volume, and these small variations must be properly accounted for to ensure accurate measurement and control of gas flow through the mass flow controller. In practice, for example, the challenge of accounting for these small variations occurs each time a mass flow controller is connected to a rate-of-change flow measurement device for calibration or validation.

SUMMARY

According to one aspect of the present disclosure, a rate-of-change flow measurement device is provided including a block body having a flow path; a chamber comprising a part of the flow path of the block body; a position control valve comprising an actuator; a valve position sensor configured to measure a valve position of the actuator of the position control valve; a first pressure sensor located on a first side of the flow path from the position control valve and configured to detect a first pressure at the first side of the flow path; a second pressure sensor located on a second side of the flow path from the position control valve and configured to detect a second pressure at the second side of the flow path adjacent the chamber; and a processor. The processor is configured to: receive valve position data from the valve position sensor indicating the valve position of the actuator; receive, from the first pressure sensor, first pressure data; receive, from the second pressure sensor, second pressure data; and calculate a volume of the chamber at least in part using the valve position data when a calibration of a device-under-test is performed by decreasing a pressure of the chamber or increasing the pressure of the chamber while opening the position control valve to maintain the first pressure constant to stay at a pressure set point.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In view of the above issues, the present disclosure relates to a rate-of-change flow measurement device that is configured to accurately and repeatably calibrate and validate a device-under-test (DUT) that is upstream or downstream of the rate-of-change flow measurement device by performing rate-of-change testing, which include rate-of-change flow measurements comprising rate-of-rise (ROR) and rate-of-fall (ROF) measurements. Flow rate calculations are based on pressure changes in the known volume chamber of the device that are measured during rate-of-change testing. In accordance with the present disclosure, accurate measurements of relatively small flow rates of fluid flows within flow paths are achieved.

Figure 1:
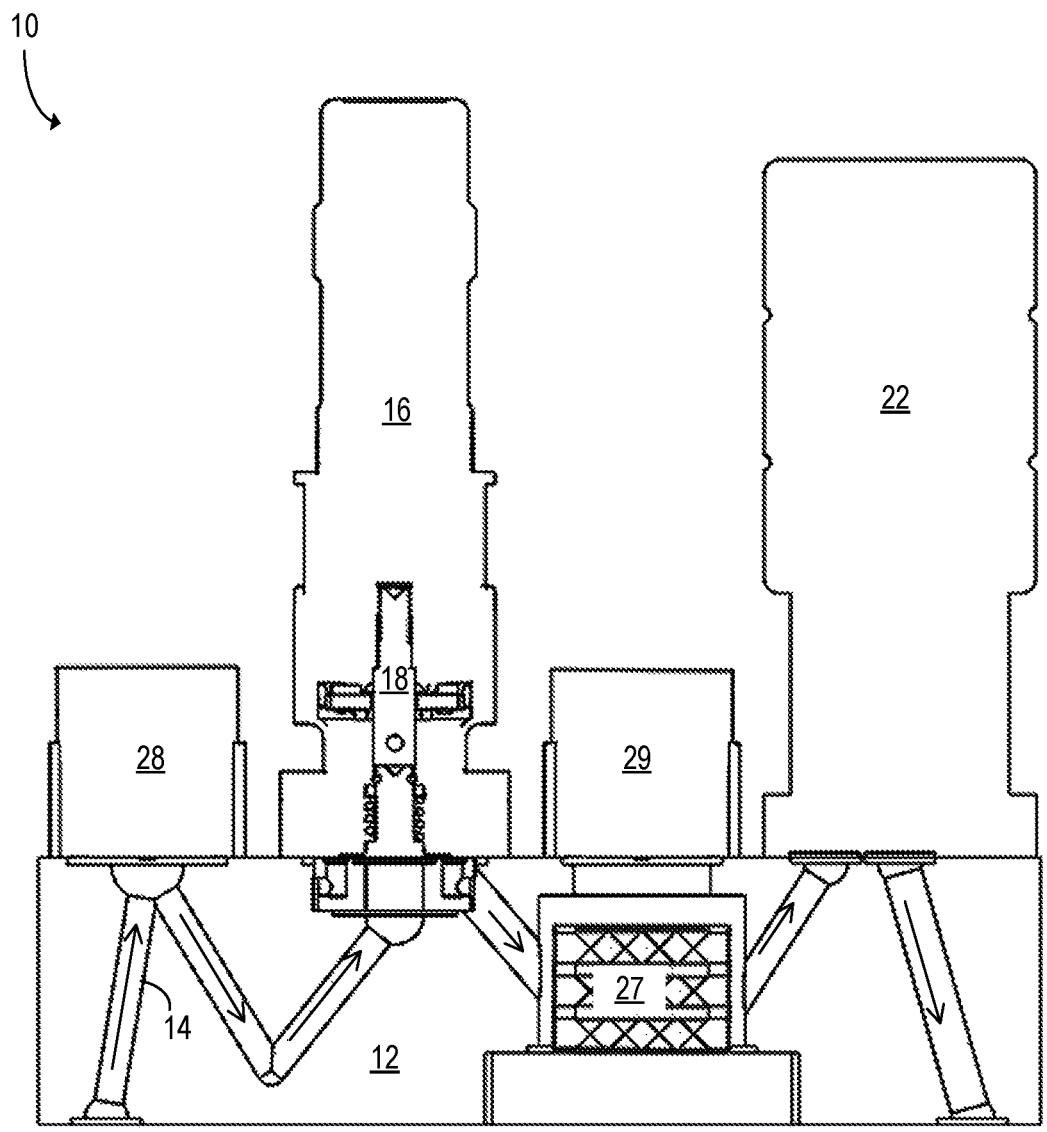
FIG. 1 shows an example rate-of-change flow measurement device according to one example embodiment.
Figure 2:
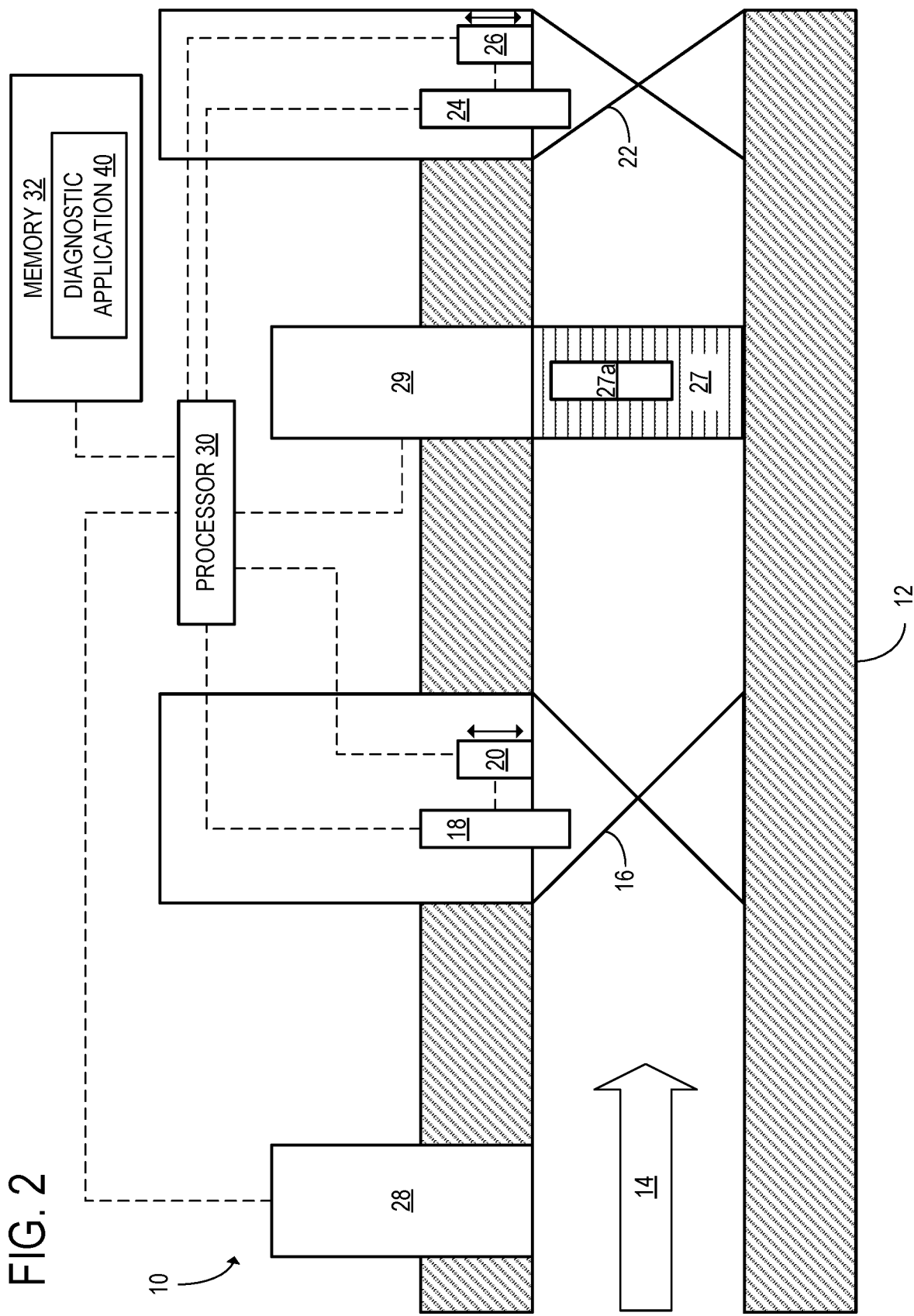
FIG. 2 is a schematic diagram depicting an example rate-of-change flow measurement device according to one example embodiment.

Referring to FIGS. 1 and 2, a rate-of-change flow measurement device 10 comprises a first pressure sensor 28, a position control valve 16, a second pressure sensor 29, a heat exchanger 27 with a chamber 27a, and an isolation valve 22 provided on a flow path 14 passing through the block body 12 of the rate-of-change flow measurement device 10. In FIGS. 1 and 2, the flow path 14 is shown flowing from left to right for ROR measurement. However, it will be appreciated that the flow direction may alternatively be directed from right to left for ROF measurement. The position control valve 16 and the isolation valve 22 are provided at least in part within the flow path 14 of the block body 12. The position control valve 16 and the isolation valve 22 may be opened and closed to control the flow of the fluid along the flow path 14.

The first pressure sensor 28 is located on an upstream side or first side of the flow path 14 from the position control valve 16 and configured to detect a first pressure at the first side of the flow path. In addition, the second pressure sensor 29 is located on a downstream side or second side of the flow path 14 from the position control valve 16 and configured to detect a second pressure at the second side of the flow path adjacent the chamber 27a. Measurements of the magnitudes of pressure rises and pressure falls detected by the second pressure sensor 29 may be used to calculate a pressure differential as discussed further below.

The first pressure sensor 28 and the second pressure sensor 29 may be configured as dual range pressure sensors which allow for high resolution measurements at low pressures as well as at high pressures. The position control valve 16 may be configured as a piezoelectric valve that acts as a mechanism for pressure regulation. The position control valve 16 further includes a position sensor 18 configured to measure the degree to which the position control valve 16 is open or closed. The valve position sensor 18 measures the valve position of an actuator 20 of the position control valve 16 within a range between fully closed and fully open. The position sensor 18 may be configured to detect nano-scale changes in the position of the actuator 20. For example, the position sensor 18 may detect an actuator displacement at a resolution of 3 to 10 nm, and detect a total actuator displacement of up to 50 μm. It will be appreciated that the displacement of the actuator 20 will determine the resolution band, and other ranges are possible.

The heat exchanger 27 is configured to reduce error-inducing thermal effects that can occur during calibration and validation of the DUT. The heat exchanger 27 includes a chamber 27a comprising part of the flow path 14. Small variations in the volume of the chamber 27a can significantly affect flow rate measurements, especially when the chamber 27a is scaled at relatively small dimensions in a micro-scaled rate-of-change flow measurement device 10 configured to measure relatively small flow rates. As discussed in further detail below, the actuator position of the position control valve 16 is determined during calibration, and then the determined actuator position is used to compensate for variations in chamber volume due to the movement of the position control valve 16. Accordingly, the position control of the actuator 20 of the position control valve 16 is used to compensate for the variations in the chamber volume.

The heat exchanger 27 may have a porous structure comprising a thermally conductive material. The heat exchanger 27 may include a labyrinthian coil passage or a serpentine passage to encourage heat exchange between the passing fluid and the walls of the heat exchanger. The heat exchanger 27 may be detachably installed within the rate-of-change flow measurement device 10, so that a user may easily uninstall the heat exchanger 27 and interchangeably install different models of the heat exchanger 27 with different chamber volumes, structures, and compositions. Alternatively, a plate coupled to the heat exchanger 27 may be detachably installed to a body of the heat exchanger 27, so that a user may easily uninstall the chamber 27a and interchangeably install different plates containing different chambers into the heat exchanger 27 to configure different chamber volumes within the heat exchanger 27. Accordingly, a user may select and install a model of heat exchanger 27 or chamber 27a that is optimized for a particular DUT, for example, such that the user may customize the heat exchanger 27 and/or chamber 27a to have an optimal chamber size.

The isolation valve 22 may further include a position sensor 24 configured to determine whether the isolation valve 22 is open or closed. The position sensor 24 may determine whether the valve position of an actuator 26 of the isolation valve 22 is fully closed or fully open. The isolation valve 22 completely seals the heat exchanger chamber 27a from leaks. One example of an isolation valve 22 is an Atomic Layer Deposition (ALD) valve, which allows for high accuracy flow metering during high speed pulsation processes that are used in ALD/Atomic Layer Etching (ALE) applications.

The rate-of-change flow measurement device 10 further includes a processor 30 and memory 32 that is operatively coupled to the processor 30. The memory 32 stores a diagnostic application 40 which is executed by the processor 30. The processor 30 receives sensor data from the first pressure sensor 28, second pressure sensor 29, position sensor 18, and position sensor 24. Further, the processor 30 sends driving signals to the actuator 20 of the position control valve 16 to open and close the position control valve 16, and the processor 30 sends driving signals to the actuator 26 of the isolation valve 22 to open and close the isolation valve 22.

In some embodiments, the processor 30 and the memory 32 may be physically integrated into the rate-of-change flow measurement device 10. Alternatively, the processor 30 and/or the memory 32 may be included in a separate physical computing device configured to communicate with components of the rate-of-change flow measurement device 10 via wired and/or wireless signals. The functions of the processor 30 and the memory 32 may, in some embodiments, be distributed between a plurality of communicatively coupled computing devices, which may include one or more client computing devices and/or one or more server computing devices.

Figure 3:
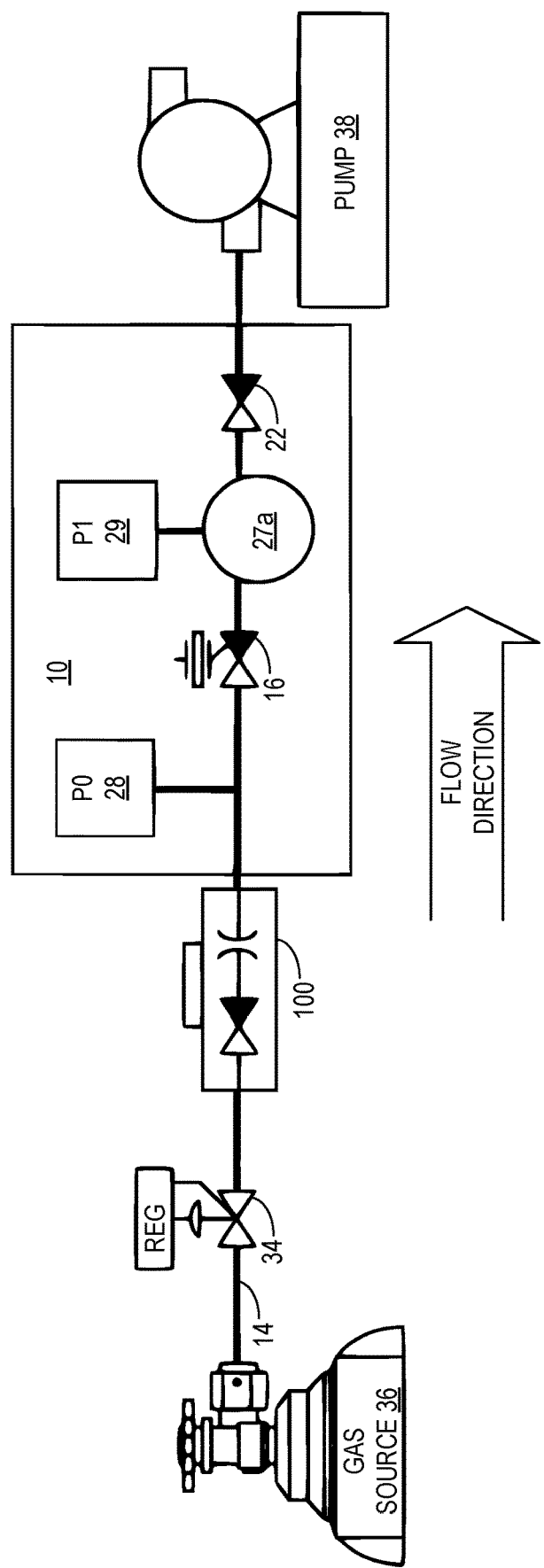
FIG. 3 schematically shows the example rate-of-change flow measurement device connected to a device-under-test (DUT) to perform a rate-of-rise (ROR) measurement according to one example embodiment.

Referring to FIG. 3, a schematic diagram is shown of an exemplary practical application of the rate-of-change flow measurement device 10 for performing a dynamic ROR measurement via the diagnostic application 40. In this example, the rate-of-change flow measurement device 10 is installed directly downstream of the DUT 100 to perform the dynamic ROR measurement. In this dynamic configuration, a gas source 36 flows a gas through a mechanical pressure regulator 34, a DUT 100, the rate-of-change flow measurement device 10, and a pump 38 in this order in a downstream direction. It will be appreciated that the gas flows into the DUT 100 at the inlet side of the DUT 100 and flows out of the DUT 100 at the outlet side of the DUT 100, where the inlet side and the outlet side are defined at fixed positions of the DUT 100. The mechanical pressure regulator 34 regulates the pressure on the inlet side of the DUT 100, thereby ensuring that there is only a pressure increase (mass accumulation) within the chamber 27a during the rate-of-change testing. Further, the position control valve 16 regulates the pressure on the outlet side of the DUT 100, thereby ensuring that there is only a pressure increase (mass accumulation) within the chamber 27a during the rate-of-change testing. This mathematically isolates the volume of the chamber 27a so that there is no need to recalibrate the volume of the chamber 27a when a new DUT 100 is calibrated or validated. The upstream pressure regulation is precise to prevent mass accumulation upstream of the chamber 27a, which may add error into the flow rate calculation. This error is minimized by optimizing the mechanical pressure regulator 34, and minimizing the volume between the DUT 100 and the mechanical pressure regulator 34.

As discussed in further detail below, to perform the dynamic ROR measurement, a pressure set point is set for the rate-of-change flow measurement device 10 to control an outlet pressure of the DUT 100. A gas source 36 is opened to start the flow of gas into the flow path 14. The isolation valve 22 is initially opened, the mechanical pressure regulator 34 is opened to continuously regulate the pressure on the inlet side of the DUT 100, and the position control valve 16 is controlled to continuously control the pressure at the first pressure sensor to stay at the pressure set point to allow the gas to spread within the entire flow path 14 until the pressure readings of the first pressure sensor 28 (labeled as P0) and the second pressure sensor 29 (labeled as P1) stabilize to reach a state of equilibrium. After the gas has reached a state of equilibrium, the isolation valve 22 is fully closed to start pressurizing the chamber 27a. As the pressure inside the chamber 27a rises following the closure of the isolation valve 22, the outlet pressure at the DUT 100 is maintained by gradually opening the position control valve 16, maintaining the pressure reading of the first pressure sensor 28 constant to stay at the pressure set point. The position control valve 16 continues controlling the pressure to stay at the pressure set point until the position control valve 16 is fully open and can no longer maintain the outlet pressure at the DUT 100.

Figure 4:
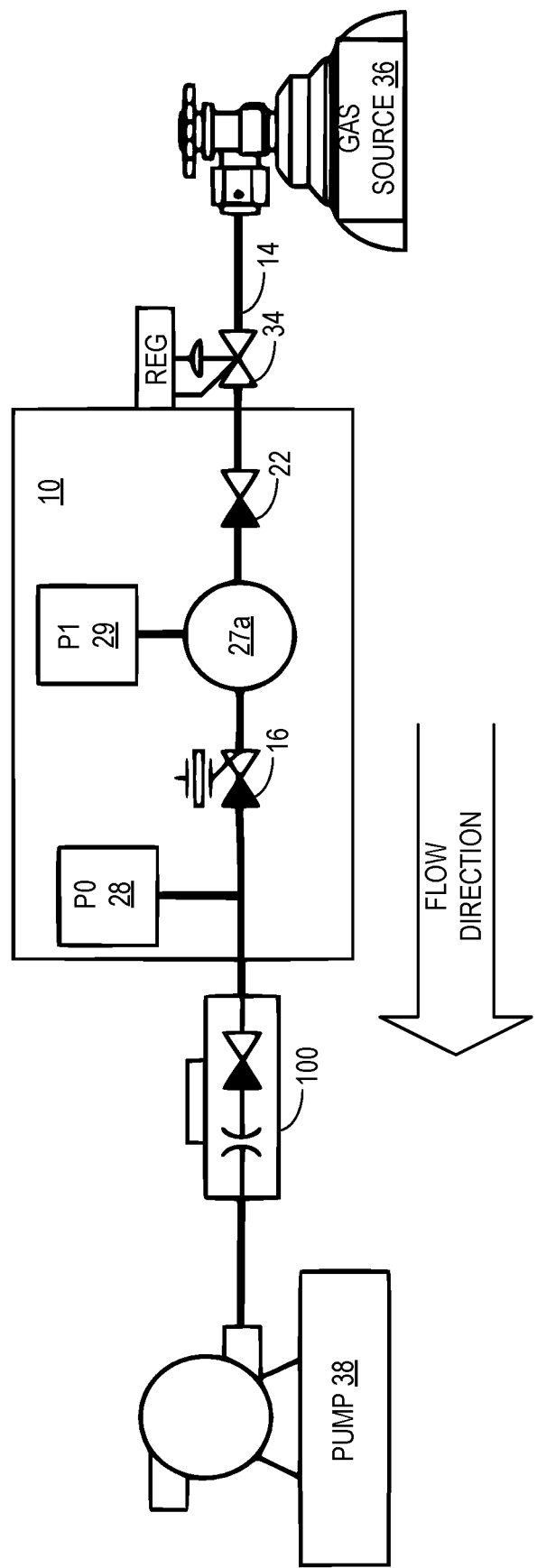
FIG. 4 schematically shows the example rate-of-change flow measurement device connected to a device-under-test to perform a rate-of-fall (ROF) measurement according to one example embodiment.

Referring to FIG. 4, a schematic diagram is shown of an exemplary practical application of the rate-of-change flow measurement device 10 for performing a dynamic ROF measurement. In this example, the rate-of-change flow measurement device 10 is installed directly upstream of the DUT 100 to perform the dynamic ROF measurement. In this dynamic configuration, a gas source 36 flows a gas through a mechanical pressure regulator 34, the rate-of-change flow measurement device 10, a DUT 100, and a pump 38 in this order in a downstream direction. It will be appreciated that the gas flows into the DUT 100 at the inlet side of the DUT 100 and flows out of the DUT 100 at the outlet side of the DUT 100, where the inlet side and the outlet side are defined at the same fixed positions of the DUT 100 as the exemplary practical application for performing the dynamic ROR measurement as illustrated in FIG. 3. The mechanical pressure regulator 34 maintains a constant pressure on the inlet of the rate-of-change flow measurement device 10. Further, the position control valve 16 regulates the pressure on the inlet side of the DUT 100, thereby ensuring that there is only a pressure fall within the chamber 27a during the rate-of-change testing. This mathematically isolates the volume of the chamber 27a so that there is no need to recalibrate the volume of the chamber 27a when a new DUT 100 is calibrated or validated.

As discussed in further detail below, to perform the dynamic ROF measurement, a pressure set point is set for the rate-of-change flow measurement device 10 to control an inlet pressure of the DUT 100. A gas source 36 is opened to start the flow of gas into the flow path 14. The isolation valve 22 is initially opened, the mechanical pressure regulator 34 is opened to continuously regulate the pressure on the inlet side of the DUT 100, and the position control valve 16 continuously controls the pressure at the first pressure sensor to stay at the pressure set point to allow the gas to spread within the entire flow path 14 until the pressure readings of the first pressure sensor 28 (labeled as P0) and the second pressure sensor 29 (labeled as P1) stabilize to reach a state of equilibrium. After the gas has reached a state of equilibrium, the isolation valve 22 is fully closed to allow the pressure inside the chamber 27a to start falling as the inlet pressure at the DUT 100 is maintained by gradually opening the position control valve 16, maintaining the pressure reading of the first pressure sensor 28 constant to stay at the pressure set point. The position control valve 16 continues controlling the pressure to stay at the pressure set point until the position control valve 16 is fully open and can no longer maintain the inlet pressure at the DUT 100.

For both of the dynamic ROR measurement and dynamic ROF measurement processes, the rate-of-change flow measurement device 10 may automatically calculate the flow rate and record all data from the first pressure sensor 28, the second pressure sensor 29, and the position sensor 18 of the position control valve 16. When the dynamic ROR measurement and dynamic ROF measurement processes are repeated multiple times, large amounts of sensor data may be collected to perform large-scale statistical analysis on the sensor data across multiple rounds of measurements.

Figure 5:
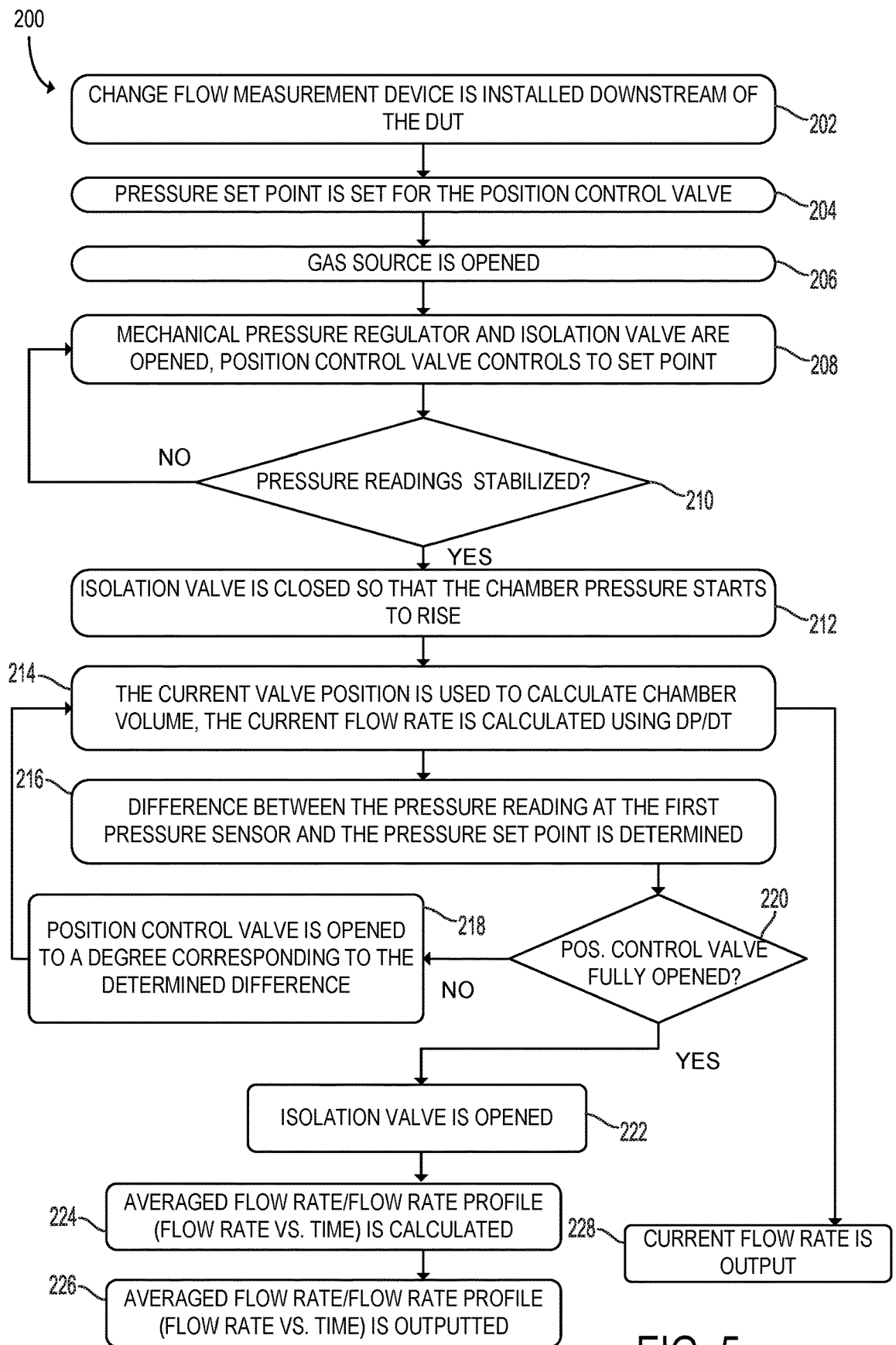
FIG. 5 shows a flowchart of an example method for performing a ROR measurement on a DUT according to one example embodiment.

Referring to FIG. 5, a method 200 for performing a ROR measurement on a DUT using a rate-of-change flow measurement device is described. The following description of method 200 is provided with reference to the software and hardware components described above and shown in FIGS. 1-3. It will be appreciated that method 200 also can be performed in other contexts using other suitable hardware and software components.

At step 202, the rate-of-change flow measurement device is installed downstream of the DUT. At step 204, the pressure set point is set for the position control valve. At step 206, the gas source is opened. At step 208, the isolation valve is opened, the mechanical pressure regulator is opened to continuously regulate the pressure on the inlet side of the DUT, and the position control valve continuously controls the pressure at the first pressure sensor to stay at the pressure set point.

At step 210, it is determined whether the pressure readings of the first and second pressure sensors have become stable. When the pressure readings of the first and second pressure sensors have stabilized (YES), then the method 200 proceeds to step 212. When the pressure readings of the first and second pressure sensors have not stabilized (NO), then the method 200 returns to step 208, and the mechanical pressure regulator continues to regulate the pressure on the inlet side of the DUT, the position control valve continues to control the pressure at the first pressure sensor to stay at the pressure set point, and the isolation valve is kept open.

At step 212, upon determining that the pressure readings have stabilized to reach a state of equilibrium, the isolation valve is fully closed so that the chamber pressure starts to rise or increase.

At steps 214, 216, 218, and 220, actuator position data of the position control valve is collected while the position control valve is gradually opened to maintain the outlet pressure at the DUT by maintaining the pressure reading of the first pressure sensor constant to stay at the pressure set point. At step 214, the current valve position is used to calculate the chamber volume, and the current flow rate is calculated using a pressure differential value (dp/dt) based on changes in the pressure reading of the second pressure sensor over time. At step 228, the current flow rate may be outputted to be displayed on a display of the rate-of-change flow measurement device and/or outputted to other computing devices for downstream processing. At step 216, the difference between the pressure reading at the first pressure sensor and the pressure set point is determined. At step 220, it is determined whether the position control valve is fully opened. If not fully opened (NO), the method 200 proceeds to step 218. At step 218, the position control valve is opened to a degree corresponding to the determined difference between the pressure reading at the first pressure sensor and the pressure set point to maintain the pressure reading of the first pressure sensor constant to stay at the pressure set point.

Accordingly, the chamber pressure is allowed to increase or rise as position control valve gradually opens to continuously maintain the DUT outlet pressure (pressure reading at first pressure sensor). The process continues until the position control valve is fully open or the position control valve can no longer maintain pressure. At step 222, upon determining that the position control valve is fully opened or the position control valve can no longer maintain pressure (YES), the isolation valve is opened.

At step 224, an averaged flow rate or flow rate profile (flow rate over time) is calculated based on the chamber volume calculated based on the collected actuator position data of the position control valve, and based on the pressure differential value calculated based on the magnitude of the pressure rise detected in the chamber by the second pressure sensor from the time at which the isolation valve was closed until the position control valve was fully opened or the position control valve could no longer maintain pressure. At step 226, the averaged flow rate or flow rate profile (flow rate over time) is outputted to be displayed on a display of the rate-of-change flow measurement device or outputted to other computing devices for downstream processing.

Figure 6:
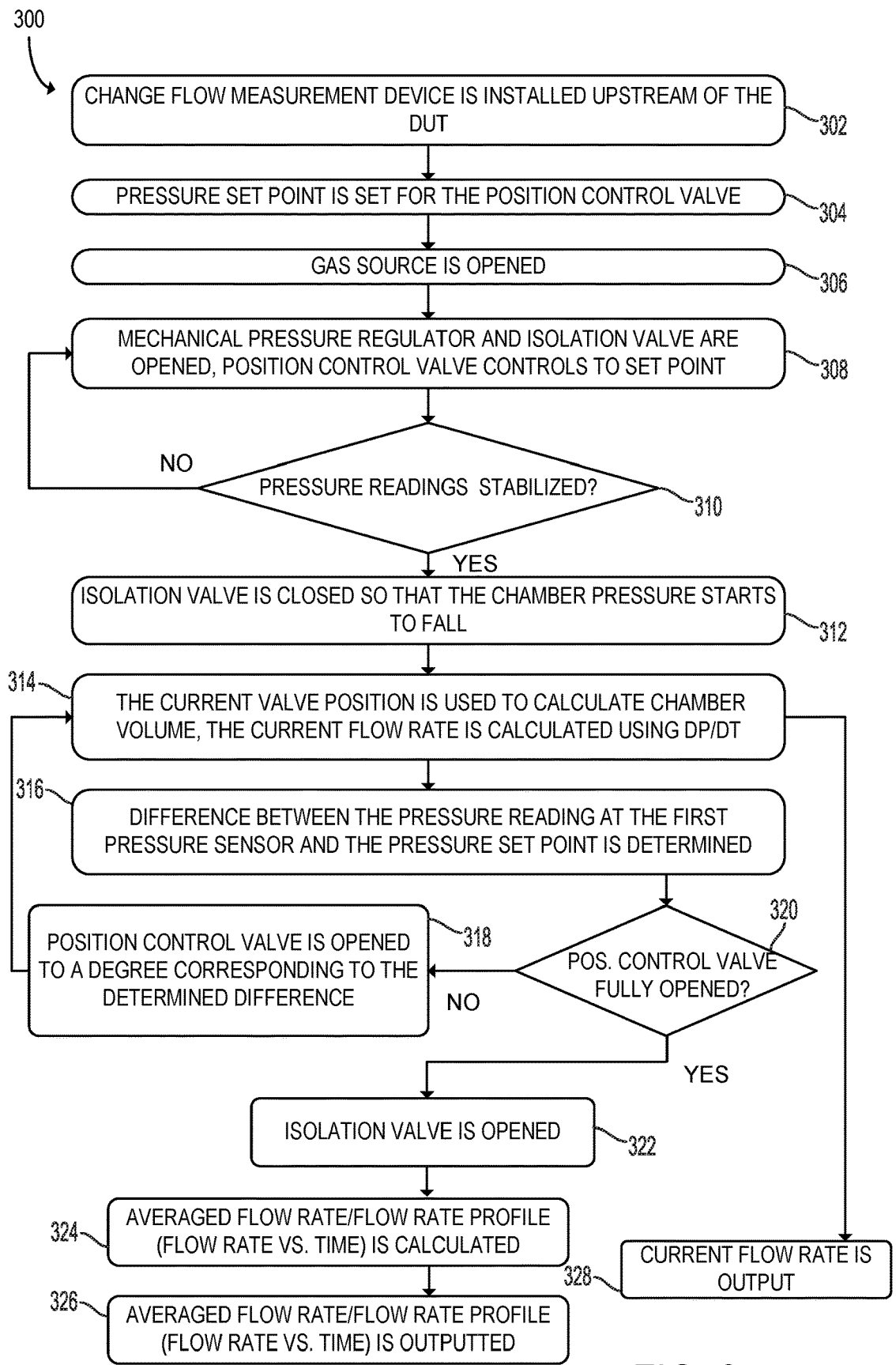
FIG. 6 shows a flowchart of an example method for performing a ROF measurement on a DUT according to one example embodiment.

Referring to FIG. 6, a method 300 for performing a ROF measurement on a DUT using a rate-of-change flow measurement device is described. The following description of method 300 is provided with reference to the software and hardware components described above and shown in FIGS. 1, 2, and 4. It will be appreciated that method 300 also can be performed in other contexts using other suitable hardware and software components.

At step 302, the rate-of-change flow measurement device 10 is installed upstream of the DUT 100. At step 304, the pressure set point is set for the position control valve. At step 306, the gas source is opened. At step 308, the isolation valve is opened, the position control valve is opened to continuously regulate the pressure on the inlet side of the DUT, and the position control valve continuously controls the pressure at the first pressure sensor to stay at the pressure set point.

At step 310, it is determined whether the pressure readings of the first and second pressure sensors have become stable. When the pressure readings of the first and second pressure sensors have stabilized (YES), then the method 300 proceeds to step 312. When the pressure readings of the first and second pressure sensors have not stabilized (NO), then the method 300 returns to step 308, and the position control valve continues to regulate the pressure on the inlet side of the DUT, the position control valve continues to control the pressure at the first pressure sensor to stay at the pressure set point, and the isolation valve is kept open.

At step 312, upon determining that the pressure readings have stabilized to reach a state of equilibrium, the isolation valve is fully closed so that the chamber pressure starts to fall or decrease.

At steps 314, 316, and 318, actuator position data of the position control valve are collected while the position control valve is gradually opened to maintain the inlet pressure at the DUT by maintaining the pressure reading of the first pressure sensor constant to stay at the pressure set point. At step 314, the current valve position is used to calculate the chamber volume, and the current flow rate is calculated using a pressure differential value (dp/dt) based on changes in the pressure reading of the second pressure sensor over time. At step 328, the current flow rate may be outputted to be displayed on a display of the rate-of-change flow measurement device or outputted to other computing devices. At step 316, the difference between the pressure reading at the first pressure sensor and the pressure set point is determined. At step 320, it is determined whether the position control valve is fully opened. If not fully opened (NO), the method 300 proceeds to step 318. At step 318, the position control valve is opened to a degree corresponding to the difference between the pressure reading at the first pressure sensor and the pressure set point to maintain the pressure reading of the first pressure sensor constant to stay at the pressure set point.

Accordingly, the chamber pressure is decreased or allowed to fall as the position control valve gradually opens to continuously maintain the DUT inlet pressure (pressure reading at first pressure sensor). The process continues until the control valve is fully open and can no longer maintain the inlet pressure to the DUT. At step 322, upon determining that the position control valve is fully opened or the position control valve can no longer maintain pressure (YES), the isolation valve is opened.

At step 324, an averaged flow rate or flow rate profile (flow rate over time) is calculated based on the chamber volume calculated based on the collected actuator position data of the position control valve, and based on the pressure differential value calculated based on the magnitude of the pressure fall detected in the chamber by the second pressure sensor from the time at which the isolation valve was closed until the position control valve was fully opened or the position control valve could no longer maintain pressure. At step 326, the averaged flow rate or flow rate profile (flow rate over time) is outputted to be displayed on a display of the rate-of-change flow measurement device or outputted to other computing devices for downstream processing.

Figure 7:
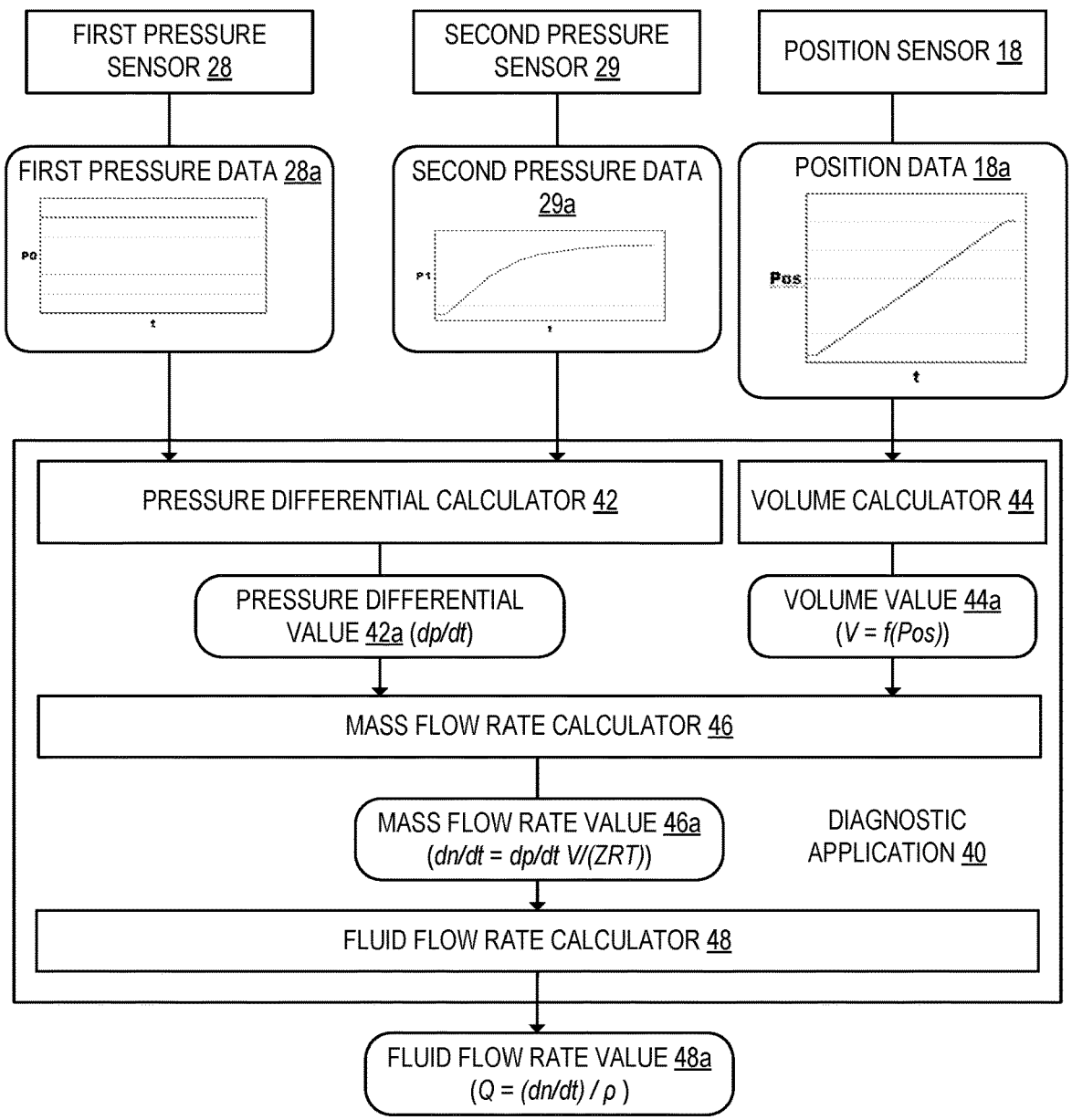
FIG. 7 shows a flow diagram illustrating data inputs that are provided to a diagnostic application, which performs calculations based on the inputs to transform the data, and output a result in accordance with an example of the present disclosure.

Referring to FIG. 7, a flow diagram is illustrated of data inputs that are provided to a diagnostic application, which performs calculations based on the inputs to transform the data, and output a result in accordance with an example of the present disclosure. As inputs, the pressure differential calculator 42 of the diagnostic application 40 receives first pressure data 28*a* from the first pressure sensor 28 and second pressure data 29*a* from the second pressure sensor 29, and the volume calculator 44 of the diagnostic application 40 receives position data 18*a* from the position sensor 18 of the position control valve. In this example illustrating inputs from a ROR measurement, the position data 18*a* depicts the position control valve that gradually opened to keep the outlet pressure of the DUT stable, the first pressure data 28*a* illustrates the outlet pressure of the DUT which was maintained constant to stay at the pressure set point, and the second pressure data 29*a* depicts the chamber pressure that progressively rose after the isolation valve was closed.

The pressure differential calculator 42 calculates a pressure differential value 42*a* (dp/dt) based on the first pressure data 28*a* and the second pressure data 29*a*, determining the magnitude of the pressure rise from the time at which the isolation valve was opened until the position control valve was fully opened. The volume calculator 44 calculates a volume value 44*a* based on a function (V=f(Pos)) that accounts for the position data 18*a* of the position control valve.

The mass flow rate calculator 46 of the diagnostic application 40 receives the pressure differential value 42*a* and the volume value 44*a* as input, calculates a mass flow rate based on the pressure differential value 42*a* and the volume value 44*a* using the equation $$\frac{dn}{dt} = \frac{dP}{dt}\frac{V}{ZRT}$$

and outputs a mass flow rate value 46a accordingly. The fluid flow rate calculator 48 receives the mass flow rate value 46a as input, calculates a fluid flow rate value 48a based on the mass flow rate value 46a by dividing the mass flow rate by the density of the mass of the fluid in the equation $Q=(dn/dt)/\rho$, where Q is the flow rate, and $\rho$ is the density of the fluid. The fluid flow rate value 48a may then be outputted to be displayed on a display of the rate-of-change flow measurement device or outputted to other computing devices.

In accordance with the present disclosure, devices can be accurately calibrated and validated for even extremely low flow rate measurements, even in processes for pulse control systems. By basing flow rate calculations on change of pressure over change in time, chamber volume is minimized. Further, volume variations of the position control valve can be compensated for, thereby increasing the accuracy of the estimations of the chamber volume.

Figure 8:
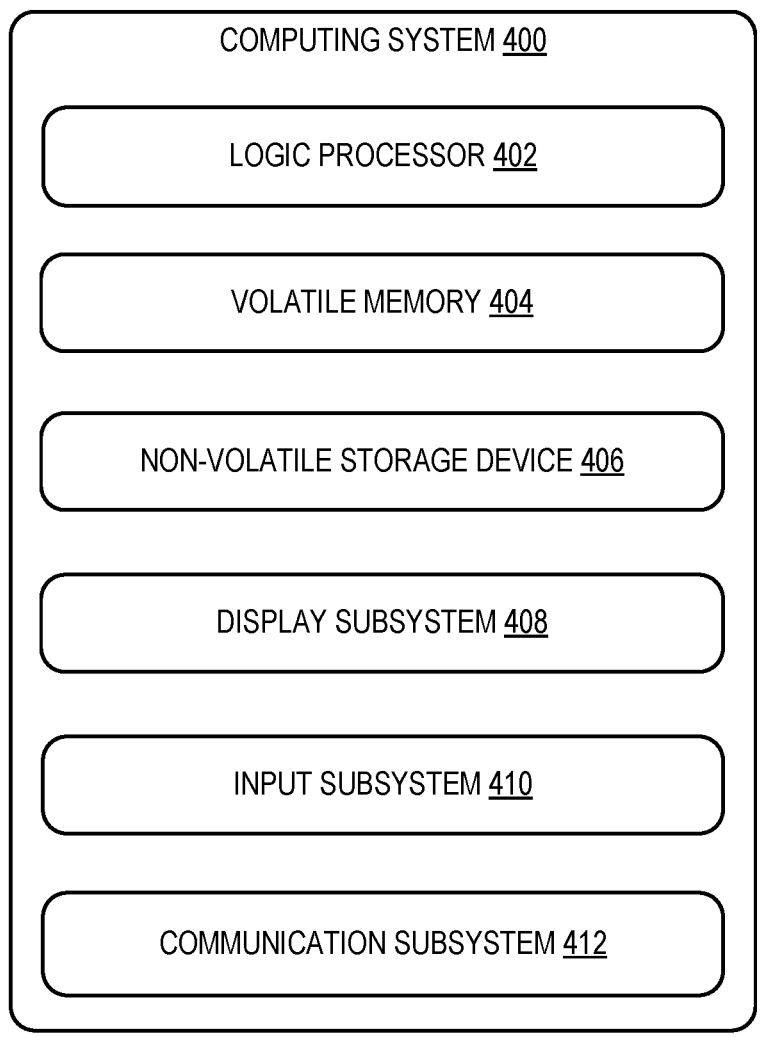
FIG. 8 shows a schematic view of an example computing environment in which the methods used with the rate-of-change flow measurement device of FIGS. 1 and 2 may be enacted.

FIG. 8 schematically shows a non-limiting embodiment of a computing system 400 that can enact one or more of the processes described above. Computing system 400 is shown in simplified form. Computing system 400 may embody the rate-of-change flow measurement device 10 and/or the processor 30 and memory 32 described above and illustrated in FIG. 2. Computing system 400 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display subsystem 408, input subsystem 410, communication subsystem 412, and/or other components not shown in FIG. 8.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject disclosure includes all novel and non-obvious combinations and sub combinations of the various features and techniques disclosed herein. The various features and techniques disclosed herein are not necessarily required of all examples of the subject disclosure. Furthermore, the various features and techniques disclosed herein may define patentable subject matter apart from the disclosed examples and may find utility in other implementations not expressly disclosed herein.

It will be appreciated that "and/or" as used herein refers to the logical disjunction operation, and thus A and/or B has the following truth table.

| A | B | A and/or B |
|---|---|---|
| T | T | T |
| T | F | T |
| F | T | T |
| F | F | F |

To the extent that terms "includes," "including," "has," "contains," and variants thereof are used herein, such terms are intended to be inclusive in a manner similar to the term "comprises" as an open transition word without precluding any additional or other elements.

The invention claimed is:

1. A rate-of-change flow measurement device comprising:
a block body having a flow path;
a chamber comprising a part of the flow path of the block body;
a position control valve comprising an actuator;
a valve position sensor configured to measure a valve position of the actuator of the position control valve;
a first pressure sensor located on a first side of the flow path from the position control valve and configured to detect a first pressure at the first side of the flow path;
a second pressure sensor located on a second side of the flow path from the position control valve and configured to detect a second pressure at the second side of the flow path adjacent the chamber; and
a processor configured to:
receive valve position data from the valve position sensor indicating the valve position of the actuator;
receive, from the first pressure sensor, first pressure data;
receive, from the second pressure sensor, second pressure data; and
calculating a volume of the chamber at least in part using the valve position data when a calibration of a device-under-test is performed by decreasing a pressure of the chamber or increasing the pressure of the chamber while opening the position control valve to maintain the first pressure constant to stay at a pressure set point.

2. The rate-of-change flow measurement device of claim 1, wherein the valve position sensor is configured to detect an actuator displacement at a resolution of 3 to 10 nm.

3. The rate-of-change flow measurement device of claim 1, further comprising a heat exchanger comprising the chamber.

4. The rate-of-change flow measurement device of claim 3, wherein the heat exchanger is detachably installed within the rate-of-change flow measurement device.

5. The rate-of-change flow measurement device of claim 3, wherein
the chamber is contained in a plate;
the heat exchanger is coupled to the plate, and
the plate is detachably installed to a body of the heat exchanger.

6. The rate-of-change flow measurement device of claim 1, further comprising an isolation valve configured to seal the chamber.

7. The rate-of-change flow measurement device of claim 6, wherein the isolation valve is an Atomic Layer Deposition valve.

8. The rate-of-change flow measurement device of claim 6, wherein the processor further calculates a pressure differential based on a magnitude of a pressure rise or fall detected in the chamber by the second pressure sensor from a time when the isolation valve is closed until the position control valve is fully opened, calculates a flow rate based on the calculated volume of the chamber and the pressure differential, and outputs the flow rate for display.

9. A method for use with a rate-of-change flow measurement device comprising a block body having a flow path, a chamber comprising a part of the flow path of the block body, a position control valve comprising an actuator, a valve position sensor configured to measure a valve position of the actuator of the position control valve, an isolation valve configured to seal the chamber, a first pressure sensor located on a first side of the flow path from the position control valve and configured to detect a first pressure at the first side of the flow path, and a second pressure sensor located on a second side of the flow path from the position control valve and configured to detect a second pressure at the second side of the flow path adjacent the chamber, the method to perform a rate-of-rise (ROR) measurement comprising:
   installing the rate-of-change flow measurement device downstream of a device-under-test (DUT) so that the DUT is on the first side of the flow path;
   setting a pressure set point for the position control valve;
   opening the isolation valve and controlling the position control valve to control the pressure at the first pressure sensor to stay at the pressure set point;
   upon stabilizing pressure readings of the first pressure sensor and the second pressure sensor, closing the isolation valve;
   collecting actuator position data of the position control valve while gradually opening the position control valve to maintain the pressure reading of the first pressure sensor constant until the position control valve is fully opened;
   calculating a volume of the chamber based on the actuator position data of the position control valve;
   calculating a pressure differential based on pressure readings from a time when the isolation valve is closed until the position control valve is fully opened;
   calculating a flow rate based on the calculated volume of the chamber and the pressure differential; and
   outputting the flow rate for display or for downstream processing.

10. The method of claim 9, wherein a mechanical pressure regulator is provided between a gas source and the DUT.

11. The method of claim 10, wherein the mechanical pressure regulator is opened to continuously regulate the pressure on an inlet side of the DUT.

12. The method of claim 9, wherein the flow rate is calculated by using the equations $$\frac{dn}{dt} = \frac{dP}{dt}\frac{V}{ZRT}$$

and $Q=(dn/dt)/\rho$, where V is the volume of the chamber, dn/dt is the mass flow rate, dp/dt is the pressure differential, Q is the flow rate, and $\rho$ is the density of the fluid.

13. The method of claim 9, wherein the actuator position data is collected at a resolution of 3 to 10 nm.

14. The method of claim 9, further comprising selecting and installing the chamber into the rate-of-change flow measurement device that is optimized for the DUT.

15. A method for use with a rate-of-change flow measurement device comprising a block body having a flow path, a chamber comprising a part of the flow path of the block body, a position control valve comprising an actuator, a valve position sensor configured to measure a valve position of the actuator of the position control valve, an isolation valve configured to seal the chamber, a first pressure sensor located on a first side of the flow path from the position control valve and configured to detect a first pressure at the first side of the flow path, and a second pressure sensor located on a second side of the flow path from the position control valve and configured to detect a second pressure at the second side of the flow path adjacent the chamber, the method to perform a rate-of-fall (ROF) measurement comprising:
   installing the rate-of-change flow measurement device upstream of a device-under-test (DUT) so that the DUT is on the first side of the flow path;
   setting a pressure set point for the position control valve;
   opening the isolation valve;
   upon stabilizing pressure readings of the first pressure sensor and the second pressure sensor, closing the isolation valve;
   collecting actuator position data of the position control valve while gradually opening the position control valve to maintain the pressure reading of the first pressure sensor constant until the position control valve is fully opened;
   calculating a volume of the chamber based on the actuator position data of the position control valve;
   calculating a pressure differential based on pressure readings from a time when the isolation valve is closed until the position control valve is fully opened;
   calculating a flow rate based on the calculated volume of the chamber and the pressure differential; and
   outputting the flow rate for display or for downstream processing.

16. The method of claim 15, wherein a mechanical pressure regulator is provided between a gas source and the rate-of-change flow measurement device.

17. The method of claim 16, wherein the mechanical pressure regulator is opened to continuously regulate the pressure on an inlet side of the DUT.

18. The method of claim 15, wherein the flow rate is calculated by using the equations $$\frac{dn}{dt} = \frac{dP}{dt}\frac{V}{ZRT}$$

and $Q=(dn/dt)/\rho$, where V is the volume of the chamber, dn/dt is the mass flow rate, dp/dt is the pressure differential, Q is the flow rate, and $\rho$ is the density of the fluid.

19. The method of claim 15, wherein the actuator position data is collected at a resolution of 3 to 10 nm.

20. The method of claim 15, further comprising selecting and installing the chamber into the rate-of-change flow measurement device that is optimized for the DUT.

* * * * *